March 19, 1935. J. H. WENZLICK 1,995,234
METHOD OF MAKING BITS FOR MINING MACHINES
Filed July 18, 1932

Inventor
John H. Wenzlick
By Sturtevant, Mason & Porter
Attorneys

Patented Mar. 19, 1935

1,995,234

UNITED STATES PATENT OFFICE 1,995,234

METHOD OF MAKING BITS FOR MINING MACHINES

John H. Wenzlick, Wheeling, W. Va., assignor to Warwood Tool Company, Wheeling, W. Va., a corporation of West Virginia Application July 18, 1932, Serial No. 623,211

5 Claims. (Cl. 76—108)

The invention relates to new and useful improvements in a method of making cutting bits for mining machines, and more particularly machines which are used for mining coal.

An object of the invention is to provide a method whereby bits for mining machines may be made from bar stock by bending and die-shaping the bar stock to form the finished bit.

A further object of the invention is to provide a method of forming bits from bar stock wherein both the lip face and the clearance face of the bit is made from bar stock by die-shaping.

In the drawing which illustrates diagrammatically the various steps in the improved method—

Figures 9, 10:
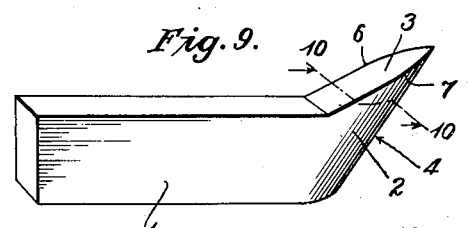
Fig. 9 is a perspective view of the finished bit formed by the fracturing of the connecting web shown in Fig. 8.
Fig. 10 is a sectional view on the line 10—10 of Fig. 9.

The purpose of the present invention is to form bits which are used in machines for the mining of coal, clay and stone, and for cutting operations similar thereto. The bit consists of a shank portion 1 which is rectangular in cross section. The cutting end 2 of the bit is provided with a lip face 3 and a clearance face 4. The side faces of the cutting end of the bit leading from the shank to the clearance edge are curved as indicated at 5, 5 in Fig. 10. The cutting lip from one cutting edge 6 to the other cutting edge 7 is flat, as clearly shown in Figures 9 and 10.

Figure 1:
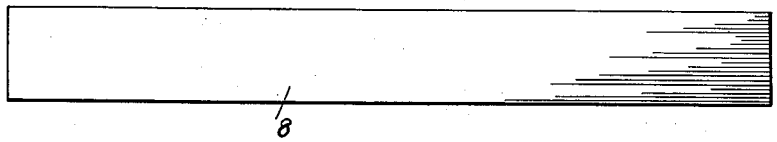
Figure 1 is a side view of a bar stock from which the bits are formed.
Figure 2:
Fig. 2 is an end view of the same.
Figure 3:
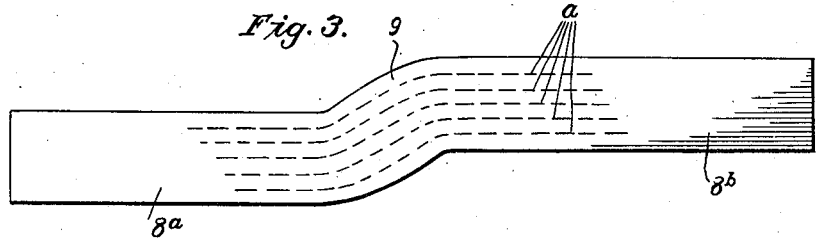
Fig. 3 is a side view showing the bar stock as bent so as to offset one portion thereof from another.
Figure 4:
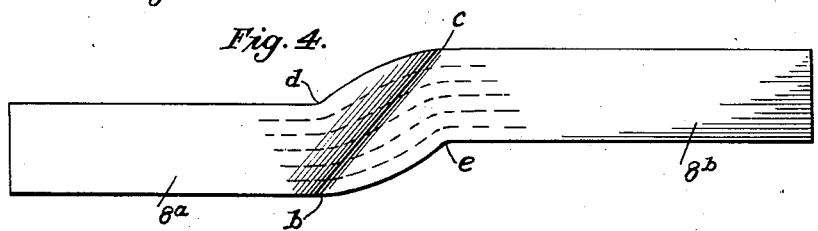
Fig. 4 is a side view of the bar stock after it has been submitted to die pressure for reducing the bar stock along a line extending from the outer inner end of one offset to the outer inner end of the other offset.
Figure 5:
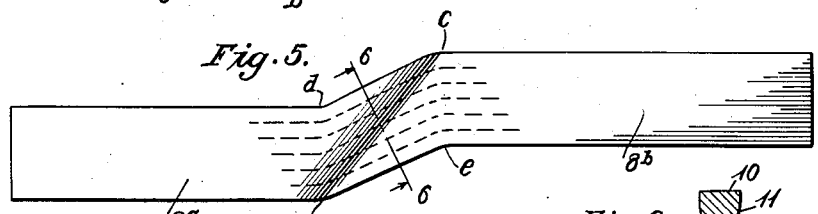
Fig. 5 is a side view showing the bar stock after it has been again submitted to die pressure for forming the lip faces of two bits.

The method consists in the forming of a bit such as just described by the bending and die-shaping of bar stock. The bar stock from which the bit is made is indicated at 8 in Fig. 1 of the drawing. This bar stock is rectangular in cross section and is dimensioned precisely as the shank 1 of the bit which is to be formed. The bar stock is placed between shaping dies or members which offset the portion 8ª thereof from the portion 8ᵇ thereof, leaving a connecting portion 9. The offsetting of one section of the bar stock from the other is accomplished by the lateral bodily shifting of the sections of the bar stock relative to each other. The grain of the bar stock is indicated by the broken lines a, a. It will be noted that the grain of the bar stock after it has been bent to offset one section relative to another, is still parallel with the edge face of the bar stock, as it was in the original bar stock. After the bar stock has been submitted to this first shaping action, it is then submitted to a die shaping means which reduces the metal along the line b—c (see Fig. 4). This is a diagonal line extending from the point b, which is the outside inner end of one offset portion, to the point c, which is the outside inner end of the other offset portion. The metal is reduced along the line b—c, which line is to form the clearance edge of two bits, the cutting ends of which are abutted and reversed, so that the lip face of one bit is at one edge of the bar stock, while the lip face of the other bit is at the other edge of the bar stock. Therefore, the dies are shaped so as to curve the side faces of the bit leading to the line b—c. During the first die-shaping of the bar stock, the edge face between the point c—d, and also between the point b—e, curves or bulges outwardly lengthwise of the lip face and during the creasing, the lip face is curved or bulged crosswise. This would make a very poor shaping for the lip face of a bit, which should be flat or in a straight line crosswise and endwise of the lip. The bar stock is then submitted to die-shaping along the edge faces, so that these edge faces are flattened from the point d to the point c, and also from the point b to the point e, as shown in Figures 5, 6 and 7.

Figure 6:
Fig. 6 is a sectional view on the line 6—6 of Fig. 5.
Figure 7:
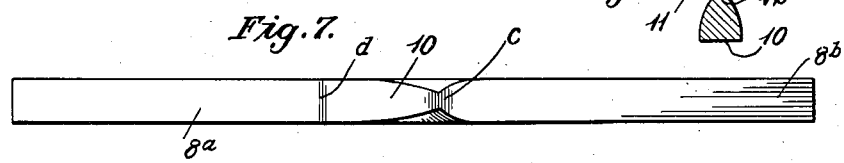
Fig. 7 is an edge view of the bar stock as shown in Fig. 5.
Figure 8:
Fig. 8 is an edge view showing the bar stock after it has been again submitted to die pressure along the same diagonal line for reducing the metal connecting the clearance faces of the two bits to a thin web.

It will be noted from Fig. 6, which is a sectional view along the line 6—6, that the edge face of the bar stock is flat or straight from one side to the other as indicated at 10, and the side faces are curved as indicated at 11, 11. This is the proper shaping for the lip face of the bit. The side faces are curved inwardly, but there is still a substantially thick metal connection 12 between the two ends of the bits. The bar stock is then submitted to another die-shaping step, wherein the metal is further reduced along the diagonal line b—c, so that there is only a thin web connecting the two bits as indicated at 13 in Fig. 8. The edge face 10 is still flat, and this is to serve as the lip face of the finished bit shown in Fig. 9. The side faces are curved to a substantial meeting line which is the clearance edge of the bit. The bit is then fractured along the thin connecting web 13 and this produces the two finished bits.

From certain aspects of the invention, it may not be necessary to submit the bar stock to the die pressure which flattens the edge face to form the flat lip face for the bit. The curved lip face in Fig. 4 may be sufficient. It is desirable, however, that the bar stock shall be offset by bodily shifting one portion relative to the other, so that the grain of the stock in the finished bit is parallel with the edge face of the shank and the lip face of the cutting portion of the bit. In other words, the grain of the metal in the lip portion is parallel to the lip face all the way to the clearance edge. This avoids the slipping of the metal along the grain by strain on the bit at the cutting point and edge. Inasmuch as the grain is parallel to the cutting edge, this strain tends to force the layers together rather than to separate and open the metal. It is also essential that the metal between the offset portions shall be shaped by die-shaping, so as to form the clearance faces of the two bits and reduce the metal so that it may be fractured along the clearance edge for the separating of the two bits and the completing of the formation thereof.

It is obvious that the method described may be applied for the forming of bits having a different shape from that illustrated. Here again, the invention resides in the steps whereby when once having selected the form of bit that is to be made, it is accomplished solely by the bending and die-shaping of the bar stock to completely finish the bits.

Having thus described the invention, what I claim as new and desire to secure by Letters Patent, is—

1. The method of forming cutting bits for mining machines consisting of bending bar stock to offset one portion thereof from another while maintaining the grain of the stock substantially parallel to the edge faces of the bar stock, die-shaping the portion of the bar stock between the offset portions for reducing the same along a diagonal line from the outside inner end of one offset portion to the outside inner end of the other offset portion for shaping and forming the clearance faces of two bits connected by a thin web of metal, and fracturing said web.

2. The method of forming cutting bits for mining machines consisting of bending bar stock to offset one portion thereof from another while maintaining the grain of the stock substantially parallel to the edge faces of the bar stock, die-shaping the portion of the bar stock between the offset portions for reducing the same along a diagonal line from the outside inner end of one offset portion to the outside inner end of the other offset portion for shaping and forming the clearance faces of two bits connected by a thin web of metal, die-shaping the edge portions of the bar stock between the offset portions for flattening said edge portions and forming the lip face of two bits and fracturing said thin web of metal to complete the formation of the bits.

3. The method of forming cutting bits for mining machines consisting in bending bar stock to offset one portion thereof from another by maintaining the grain of the stock substantially parallel to the edge faces of the bar stock, die-shaping the portion of the bar stock between the offset portions for reducing the same along a diagonal line from the outside inner end of one offset portion to the outside inner end of the other offset portion, die-shaping the edge portions of the bar stock between the offset portions for flattening said edge portions and forming the lip face of two bits, again die-shaping the portion of the bar stock between the offset portions along a diagonal line for reducing the bar stock and completing the formation of the clearance faces of the bits, leaving a thin connecting web joining the clearance edges of the bits and fracturing said thin web of metal to complete the formation of the bits.

4. The method of forming cutting bits for mining machines consisting in bending bar stock to offset one portion thereof from another by maintaining the grain of the stock substantially parallel to the edge faces of the bar stock, die-shaping the portion of the bar stock between the offset portions for reducing the same along a diagonal line from the outside inner end of one offset portion to the outside inner end of the other offset portion, die-shaping the edge portions of the bar stock between the offset portions for flattening said edge portions and forming the lip face of two bits, again die-shaping the portion of the bar stock between the offset portions along the same diagonal line for reducing the bar stock and completing the formation of the clearance faces of the bits, leaving a thin connecting web joining the clearance edges of the bits and fracturing said thin web of metal to complete the formation of the bits.

5. The method of forming cutting bits for mining machines consisting in bending bar stock dimensioned to form the shanks of bits so as to offset one portion thereof from another, die-shaping the portion of the bar stock between the offset portions for shaping and forming the cutting end of two bits joined by a thin web of metal and fracturing said thin web of metal to complete the formation of the bits.

JOHN H. WENZLICK.